US006932448B1

(12) United States Patent
Lota

(10) Patent No.: US 6,932,448 B1
(45) Date of Patent: Aug. 23, 2005

(54) DOOR WITH SELF-RETAINING KNOB

(75) Inventor: Charan Singh Lota, Canton, MI (US)

(73) Assignee: Toyota Technical Center USA, Inc., Ann Arbor, MI (US)

(*) Notice: Subject to any disclaimer, the term of this patent is extended or adjusted under 35 U.S.C. 154(b) by 8 days.

(21) Appl. No.: 10/791,419

(22) Filed: Mar. 2, 2004

(51) Int. Cl.$^7$ .............................................. A47B 51/00
(52) U.S. Cl. ..................... 312/326; 296/37.1; 296/152; 296/37.8
(58) Field of Search ............................. 296/37.1, 37.8, 296/37.9, 37.12, 37.13, 37.15, 37.16, 152; 292/336.3, 150, DIG. 53, 34, 347, 348, DIG. 38; 49/503, 460; 70/107, 224, 451; 312/326, 312/296, 138.1, 330.1; 219/413; 109/51

(56) References Cited

U.S. PATENT DOCUMENTS

| | | | | |
|---|---|---|---|---|
| 4,348,967 A | * | 9/1982 | Schattner et al. .............. | 109/51 |
| 4,586,762 A | * | 5/1986 | Kennedy et al. .......... | 312/330.1 |
| 4,712,823 A | * | 12/1987 | Mills et al. ................. | 296/37.8 |
| 4,744,126 A | * | 5/1988 | Bisbing ........................ | 16/443 |
| 4,922,576 A | * | 5/1990 | Weidner et al. ........... | 312/138.1 |
| 5,355,554 A | * | 10/1994 | Magoon ....................... | 49/460 |
| D442,846 S | * | 5/2001 | Bastian ......................... | D8/313 |
| 6,595,605 B1 | * | 7/2003 | Babcock et al. ............. | 312/296 |
| 6,730,882 B2 | * | 5/2004 | Atkinson ..................... | 219/413 |

| | | | | |
|---|---|---|---|---|
| 6,843,085 B2 | * | 1/2005 | Dimig ...................... | 292/336.3 |
| 2003/0052513 A1 | * | 3/2003 | Uleski ......................... | 296/152 |
| 2003/0230958 A1 | * | 12/2003 | Katori ......................... | 312/326 |
| 2005/0055766 A1 | * | 3/2005 | Warning ........................ | 4/619 |

FOREIGN PATENT DOCUMENTS

| | | | | |
|---|---|---|---|---|
| JP | 08-091047 | 4/1996 | ............. | B60J 5/00 |
| JP | 08-156022 | 6/1996 | ........... | B29C 45/14 |
| JP | 08-183343 | 7/1996 | ............. | B60J 5/04 |
| JP | 2001-219805 | 8/2001 | ........... | B60R 21/20 |
| JP | 2003-081021 | 3/2003 | ........... | B60R 13/02 |

* cited by examiner

*Primary Examiner*—Kiran B. Patel
(74) *Attorney, Agent, or Firm*—Gifford, Krass, Groh, Sprinkle, Anderson & Citkowski, P.C.

(57) ABSTRACT

A door with self-retaining knob for a storage compartment is provided. The storage compartment has a lower wall, an upper wall opposite the lower wall and side walls disposed between the upper and lower walls. A pivotal door is integral with the upper wall, and the door includes an inner panel and an outer panel having an aperture. A knob is disposed between the inner door panel and the outer door panel. The knob has a front wall with side walls extending from an edge of the front wall and a flange extending radially from an edge of the side wall. A fastening means is used for securing the inner door panel to the outer door panel, so that the knob flange is fixedly retained between the outer door panel and the inner door panel and the front wall and side wall of the knob extend through the aperture in the outer door panel.

9 Claims, 3 Drawing Sheets

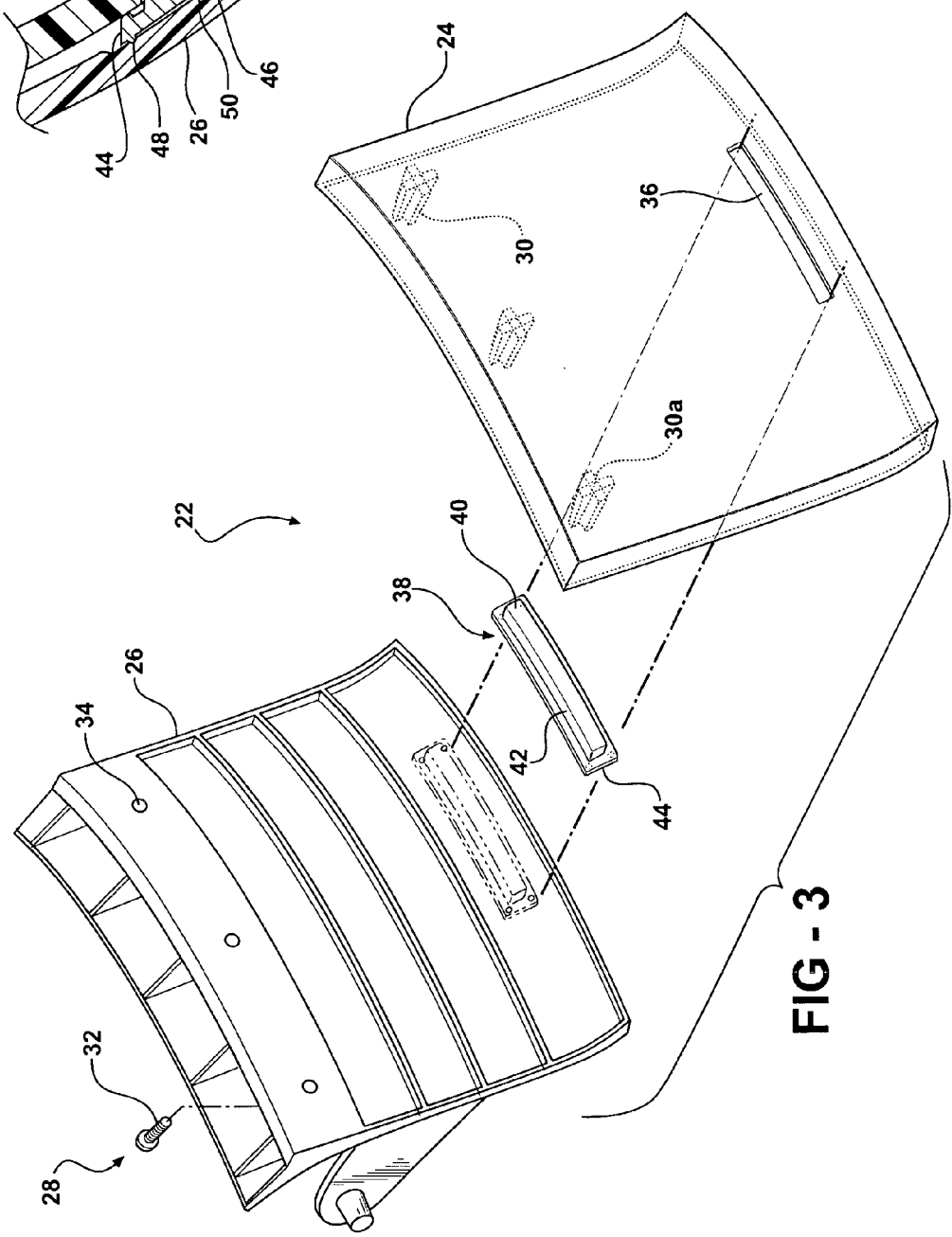

DOOR WITH SELF-RETAINING KNOB

BACKGROUND OF THE INVENTION

1. Field of the Invention

The present invention relates generally to a door and, more specifically, to a door with a self retaining knob for accessing a storage compartment in a motor vehicle.

2. Description of the Related Art

The interior of a vehicle, such as a motor vehicle, typically includes a storage compartment or bin having a door, which pivots to provide access to the interior of the storage compartment. The door may include a knob or handle to assist a user in opening the storage compartment door.

In the past, the knob or handle was attached to the door using a fastening means, such as a screw, or by gluing, or the like. While these methods work well, there are concerns associated with each. The screws commonly used are small and therefore difficult to handle in a manufacturing operation. The utilization of an adhesive in a manufacturing operation is difficult to control. For example, the adhesive may attract foreign objects such as dirt or dust, or it may transfer to the hands of the installer, or it may seep beyond the edge of the handle. The knob or handle may break off over time as a result of weak adhesive bond.

Thus there is a need in the art for a knob or handle which is easy to attach to a door during a manufacturing operation and is durable over the life of the product.

SUMMARY OF THE INVENTION

Accordingly, the present invention is a self retaining knob for the door of a storage compartment. The storage compartment has a lower wall, an upper wall opposite the lower wall and side walls disposed between the upper and lower walls. A pivotal door is integral with the upper wall, and the door includes an inner panel and an outer panel having an aperture. A knob is disposed between the inner door and the outer door panel. The knob has a front wall with side walls extending from an edge of the front wall and a flange extending radially from an edge of the side wall. A fastening means is used for securing the inner door panel to the outer door panel, so that the flange portion of the knob is fixedly retained between the outer door panel and the inner door panel and the front wall and sidewall of the knob extend through the aperture in the outer door panel.

One advantage of the present invention is that a self retaining knob is provided that can be secured on a door without a fastening means, such as a fastener or an adhesive. Another advantage of the present invention is that a self-retaining knob is provided that can be positively installed during a manufacturing process, without the use of a tool or a secondary operation. Still another advantage of the present invention is that a self-retaining knob is provided that is cost-effective to produce and install. A further advantage of the present invention is that a self-retaining knob is provided that is durable over the life of the door it is secured to.

Other features and advantages of the present invention will be readily appreciated, as the same becomes better understood after reading the subsequent description taken in conjunction with the accompanying drawings.

BRIEF DESCRIPTION OF THE DRAWINGS

FIG. 3 is an exploded perspective view of the door of FIG. 1, according to the present invention.

FIG. 4 is a sectional view of the self retaining knob of FIG. 1 taken along line 4—4, according to the present invention.

DESCRIPTION OF THE PREFERRED EMBODIMENT(S)

Referring to FIGS. 1–4 an embodiment of a door with a self-retaining knob is illustrated. In this embodiment, the self-retaining knob is attached to a door of a storage compartment 12 used in the interior of a motor vehicle 10, although other uses are contemplated. In the prior art, the knob or handle was attached to a door using a fastening means. For example, the back of the knob included a bore for receiving a screw from the back side of the door, so that it is not visible. Alternatively, the screw is glued to the door during the manufacturing process, or includes a pre-applied adhesive that is activated just prior to securing the knob to the door.

Figure 1:
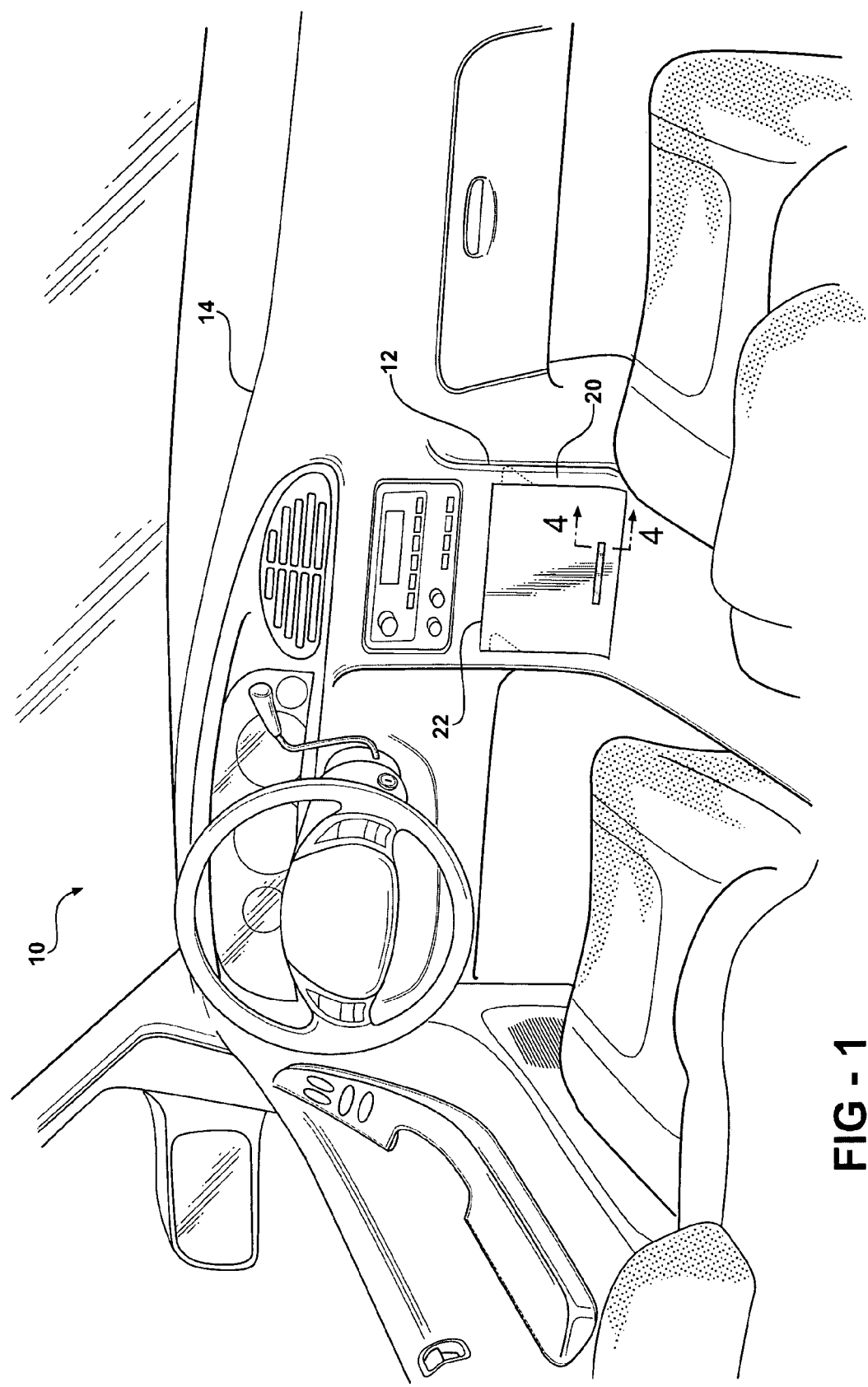
FIG. 1 is a perspective view of a door for a storage compartment with a self retaining knob within the environment of a vehicle, according to the present invention.
Figure 2A:
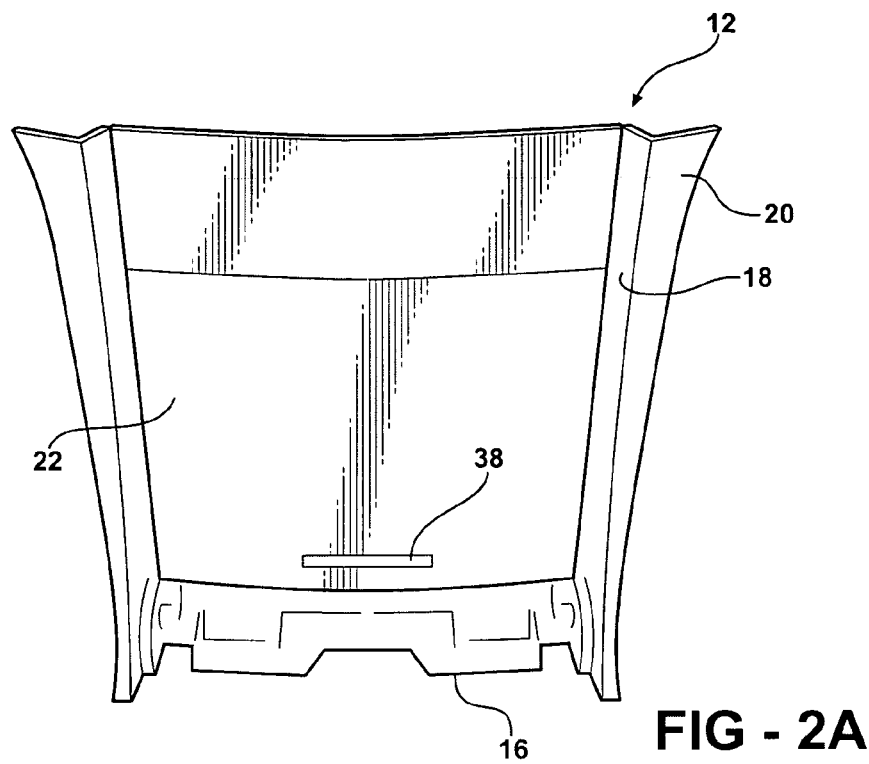
FIG. 2a is an elevational frontal view of the storage compartment of FIG. 1, according to the present invention.
Figure 2B:
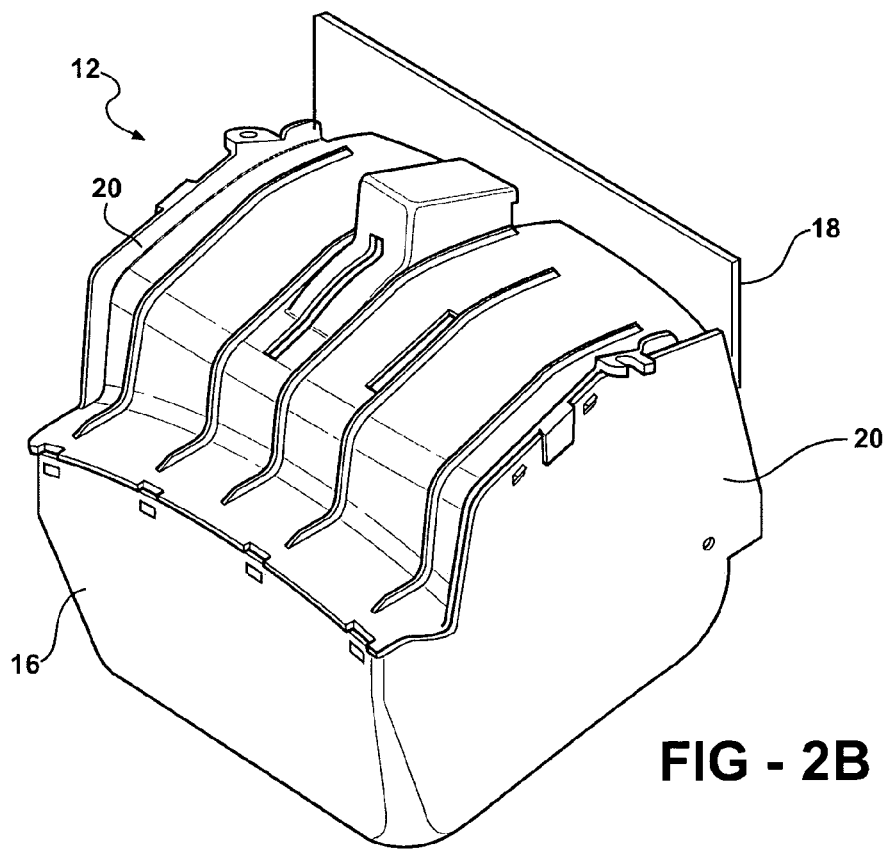
FIG. 2b is a perspective view of the rear view of the storage compartment of FIG. 1, according to the present invention.

Various types of storage compartments 12 are contemplated. The storage compartment 12 may be a stand alone unit as shown in FIGS. 2a and 2b, or it may be integrated with an instrument panel 14, as shown in FIG. 1. The storage compartment 12 generally has a box shape, and includes a lower wall 16, an upper wall 18 opposite the lower wall 16 and a plurality of side walls 20 disposed between the lower and upper walls 16, 18, respectively. It should be appreciated that in this example, the storage compartment 12 includes a door 22 formed in the upper wall 18 to provide access into the storage compartment 12. It is also contemplated that the door 22 may encompass a portion of the upper wall 18, or the entire upper wall 18.

As shown in FIG. 3, the door 22 preferably includes an outer panel 24 and an inner panel 26. It should be appreciated that in this example the outer door panel 24 is decorative in appearance, while the inner panel 26 is functional. For example, the inner door panel 26 provides structural support to the storage compartment 12. The outer door panel 24 and inner door panel 26 are held together using a fastening means 28, such as a boss 30 for receiving a fastener 32 such as a screw or the like. In this example, the inner door panel 26 includes a plurality of apertures shown at 34, and the outer door panel 24 includes a plurality of corresponding bosses 30 projecting radially from a back surface 26a of the inner door panel 26. The boss 30 includes a longitudinally extending bore 30a for receiving the screw 32. The outer door panel 24 includes an aperture shown at 36 for receiving a knob 38, in a manner to be described. The inner door panel 26 and outer door panel 24 are preferably each fabricated from a suitable material such as plastic or nylon or the like.

The knob 38 is utilized in operating the door 22. In this example, the door 22 is opened using a push—push operation. In other words, the knob 38 is pushed inwardly a first predetermined distance to unlatch the door 22 and a second predetermined distance to release the door 22. It is also contemplated that the knob 38 can be utilized in other types of opening operations, such as push, pull, or a combination of push and pull or the like.

The knob 38 includes a front wall 40, and side walls 42 extending from the edges of the front wall 40 to form an open box shape. It should be appreciated that other shapes are contemplated. The knob 38 also includes a flange 44 extending radially from an edge of each of the side walls 42. The flange 44 is continuous, and extends radially a predetermined distance. In this example, the knob 38 forms a "T" shape in cross-section, as shown in FIG. 4. The flange 44 may include a plurality of raised portions 46 protruding from a back side of the flange 44 and having a predetermined shape for seating the knob in a corresponding recess 48 in the inner door panel 26 having a similar shape to that of the flange raised portion 46. In this example the shape is arcuate. The combination of raised portion 46 and recess 48 provides an alignment means 50, which assists in positioning and maintaining the alignment of the knob 38 between the inner door panel 26 and outer door panel 24. It is contemplated that the knob 38 is decorative in appearance, and may be made from a variety of materials, including metal, plastic, nylon, wood or some combination of materials, or the like.

In operation, the knob 38 is positioned through the aperture 36 in the outer door panel 24 from the back side. The inner door panel 26 is secured to the outer door panel 24 using the fastening means 28, such that the raised portion 46 of the flange 14 is seated in the corresponding recess 48 in the inner door panel 26. The knob walls 40, 42 extend through the aperture 36 in the outer door panel 24 into the interior of the vehicle, and the knob flange 44 is sandwiched between the inner door panel 26 and outer door panel 24. It should be appreciated that the shape and size of the outer door panel aperture 36 corresponds to the configuration of the knob 38. The bosses 30 of the outer door panel 24 are aligned with the corresponding inner door panel apertures 34. A fastener such as a screw 32 is screwed into the bores 30a in the inner panel boss 30 to secure the inner door panel 26 to the outer door panel 24. As a result of the forces distributed by the inner door panel 26 on the outer door panel 24, the knob 38 is securely held in place.

The storage compartment 12 and knob 38 may include other features in addition to those described herein. In addition, other uses for a door with a self retaining knob are contemplated in addition to this example for a storage compartment.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A door with self-retaining knob comprising:
   a storage compartment having a lower wall, an upper wall opposite the lower wall and side walls disposed between the upper and lower walls;
   a pivotal door integral with said upper wall, wherein said door includes an inner door panel and an outer door panel having an aperture;
   a knob disposed between said inner door panel and said outer door panel, having a front wall with side walls extending from an edge of said front wall and a flange extending radially from an edge of said side wall; and
   a fastening means for securing said inner door panel to said outer door panel so that said knob flange is fixedly retained between said outer door panel and said inner door panel and said front wall and side wall of said knob extend through the aperture in said outer door panel.

2. A door with self-retaining knob as set forth in claim 1 wherein a back side of said knob flange includes a raised portion and said inner door panel includes a corresponding recess, such that said flange raised portion is fittingly disposed in said inner door panel recess when said knob is fixedly retained between said outer door panel and said inner door panel.

3. A door with self-retaining knob as set forth in claim 1 wherein said fastening means includes a plurality of radially extending bosses on a back side of said outer door panel and said inner door panel includes a plurality of apertures corresponding to said outer door panel bosses, such that said outer door panel bosses extend through the corresponding apertures in said inner door panel and a fastener is engaged by said bosses to secure said inner door panel and said outer door panel together.

4. A door with self-retaining knob as set forth in claim 3 wherein said fastener is a screw.

5. A door with self-retaining knob for use in a vehicle comprising:
   a storage compartment having a lower wall, an upper wall opposite the lower wall and side walls disposed between the upper and lower walls;
   a pivotal door integral with said upper wall, wherein said door includes an inner door panel and an outer door panel having an aperture;
   a knob disposed between said inner door panel and said outer door panel, having a front wall with side walls extending from an edge of said front wall and a flange extending radially from an edge of said side wall; and
   a fastening means for securing said inner door panel to said outer door panel wherein a back side of said knob flange includes a raised portion and said inner door panel includes a corresponding recess, such that said flange raised portion is fittingly disposed in said inner door panel recess when said knob is fixedly retained between said outer door panel and said inner door panel, and said flange portion of said knob is fixedly retained between said outer door panel and said inner door panel and said front wall and side walls of said knob extend through the aperture in said outer door panel.

6. A door with self-retaining knob as set forth in claim 5 wherein said fastening means includes a plurality of radially extending bosses on a back side of said outer door panel and said inner door panel includes a plurality of apertures corresponding to said outer door panel bosses, such that said outer door panel bosses extend through said the corresponding apertures in said inner door panel, and a fastener is engaged by said bosses to secure said inner door panel and said outer door panel together.

7. A door with self-retaining knob as set forth in claim 6 wherein said fastener is a screw.

8. A door with self-retaining knob for use in a vehicle comprising:
   a storage compartment having a lower wall, an upper wall opposite the lower wall and side walls disposed between the upper and lower walls;
   a pivotal door integral with said upper wall, wherein said door includes an inner door panel and an outer door panel having an aperture;
   a knob disposed between said inner door panel and said outer door panel, having a front wall with side walls extending from an edge of said front wall and a flange extending radially from an edge of said side wall;

wherein a backside of said knob flange includes a raised portion and said inner door panel includes a corresponding recess, such that said flange raised portion is fittingly disposed in said inner door panel recess when said knob is fixedly retained between said outer door panel and said inner door panel, and said front wall and said side walls of said knob extends through the aperture in said outer door panel; and a fastening means for securing said inner door panel to said outer door panel so that said knob flange is fixedly retained between said outer door panel and said inner door panel wherein said fastening means includes a plurality of radially extending bosses on a back side of said outer door panel and said inner door panel includes a plurality of apertures corresponding to said outer door panel bosses, such that said outer door panel bosses extend through the corresponding apertures in said inner door panel, and a fastener is engaged by said bosses to secure said inner door panel and said outer door panel together.

9. A door with self-retaining knob as set forth in claim 8 wherein said fastener is a screw.

* * * * *